United States Patent
Fornof et al.

(10) Patent No.: US 6,358,300 B1
(45) Date of Patent: Mar. 19, 2002

(54) LITHIUM CHLORIDE DESICCANT FOR TRAILER AIR DRYER AND PRESSURE SWING DEHYDRATION

(75) Inventors: William P. Fornof, Girard, PA (US); Richard J. Conklin, Bay Village, OH (US)

(73) Assignee: Honeywell Commercial Vehicle Systems Co., Elyria, OH (US)

( * ) Notice: Subject to any disclaimer, the term of this patent is extended or adjusted under 35 U.S.C. 154(b) by 0 days.

(21) Appl. No.: 09/536,550

(22) Filed: Mar. 28, 2000

(51) Int. Cl.⁷ .......................... B01D 53/28; B01D 53/04
(52) U.S. Cl. .................. 95/91; 95/117; 95/122; 96/118; 96/144; 96/154
(58) Field of Search ............. 95/91, 117, 121–123; 96/108, 118, 125, 130, 143, 144, 154

(56) References Cited

U.S. PATENT DOCUMENTS

| | | | | |
|---|---|---|---|---|
| 2,143,008 A | * | 1/1939 | Heath et al. | 96/118 X |
| 2,792,071 A | * | 5/1957 | Pennington | 96/118 |
| 3,392,511 A | * | 7/1968 | King, Jr. | 96/118 |
| 3,470,708 A | * | 10/1969 | Weil et al. | 96/125 X |
| 3,484,322 A | * | 12/1969 | Inskeep | 96/154 X |
| 3,733,791 A | * | 5/1973 | Dravnieks | 96/118 X |
| 3,807,149 A | * | 4/1974 | Norback | 96/118 |
| 3,865,924 A | * | 2/1975 | Gidaspow et al. | 96/118 X |
| 4,035,172 A | * | 7/1977 | Strindehag et al. | 96/118 |
| 4,038,059 A | * | 7/1977 | Strindehag et al. | 96/118 |
| 4,235,608 A | * | 11/1980 | Watanabe et al. | 96/118 |
| 4,255,171 A | * | 3/1981 | Dravnieks | 96/118 |
| 4,377,400 A | * | 3/1983 | Okamoto et al. | 96/118 X |
| 4,402,717 A | * | 9/1983 | Izumo et al. | 96/118 |
| 4,484,938 A | * | 11/1984 | Okamoto et al. | 96/118 |
| 4,492,592 A | * | 1/1985 | Diaz et al. | 95/91 X |
| 4,492,593 A | * | 1/1985 | Diaz | 95/91 X |
| 5,135,548 A | * | 8/1992 | Golden et al. | 95/91 |
| 5,458,677 A | * | 10/1995 | VanderMolen | 96/144 X |
| 5,607,500 A | * | 3/1997 | Shamine et al. | 96/144 |

FOREIGN PATENT DOCUMENTS

| | | | | |
|---|---|---|---|---|
| DE | 2839112 | * | 3/1979 | 96/125 |
| DE | 3902977 | * | 8/1989 | 96/125 |
| JP | 53-062262 | * | 6/1978 | 96/154 |
| JP | 54-109089 | * | 8/1979 | 96/118 |
| JP | 55-039240 | * | 3/1980 | 96/118 |
| JP | 55-119421 | * | 9/1980 | 96/154 |
| JP | 57-144021 | * | 9/1982 | 95/91 |
| JP | 63-016025 | * | 1/1988 | 96/118 |
| JP | 04-104811 | * | 4/1992 | 96/154 |

* cited by examiner

Primary Examiner—Robert H. Spitzer

(57) ABSTRACT

A drying material disposed in the passage of a compressed air system for removing moisture from air or gas includes a plurality of semi-rigid porous substrates impregnated with lithium chloride. The drying material is formed by preparing a saturated solution of lithium chloride and a nonflammable solvent. Porous substrata are contacted with the saturated solution to wet the substrata surface. The wet substrata are heated at a sufficient temperature for a sufficient duration to drive off excess liquid from the substrate. A desiccant comprising lithium chloride impregnated substrata is produced.

17 Claims, 2 Drawing Sheets

LITHIUM CHLORIDE DESICCANT FOR TRAILER AIR DRYER AND PRESSURE SWING DEHYDRATION

BACKGROUND OF THE INVENTION

1. Field of the Invention

This invention relates to an air dryer system for use in a compressed air system. More particularly, the invention relates to an air dryer system comprising a lithium chloride desiccant.

2. Discussion of the Art

Compressed air systems are widely used to operate a number of devices, and find particular use in braking systems for heavy vehicles. These systems include an air compressor which compresses ambient air and charges a storage reservoir. The compressor is engine operated and a governor, responsive to the reservoir pressure, selectively enables or disables the compressor as needed. Air dryers commonly employ a drying material or desiccant through which air passes to remove entrained moisture and limit problems related to moisture associated with brake system components. Moisture is adsorbed by the desiccant and removed from the compressed air before it is communicated to the storage reservoir. In these known systems, periodic or cyclic purging of the air dryers is required in order to purge or regenerate the desiccant.

Furthermore, in pneumatic systems such as those associated with trailer air dryers, the moisture in the air is often mixed with hydrocarbons. Low pH organic acids are formed which affect the various rubber components associated with the system. In addition, the hydrocarbons cause damage to the desiccants, and render them less productive. For example, desiccants comprised of molecular sieves, zeolites and silicas are oleophilic. As a result, air dryers associated with these desiccants are less effective and function at reduced efficiency. Entire desiccant cartridge assemblies are replaced on a periodic basis, often between about one and five years. There is a need for a desiccant useful in compressed air systems that tolerates oil and efficiently absorbs the moisture present in the compressed air that flows through a trailer air dryer.

SUMMARY OF THE INVENTION

The present invention solves the noted problems and others and provides an air dryer useful in a trailer braking and suspension system.

According to the invention, an air dryer for a trailer braking assembly comprises a housing having a passage extending therethrough for receiving air from a supply end and providing air to a delivery end. The passage is adopted for holding a drying material for removing moisture from the air. A drying material disposed in the passage includes a plurality of semi-rigid porous substrates impregnated with lithium chloride.

According to another aspect of the invention, an adsorbent desiccant for dehydrating moist gas by adsorption comprises a plurality of semi-rigid porous substrata carriers. Each carrier is impregnated with lithium chloride for removing moisture from the compressed air system.

According to another aspect of the invention, a desiccant for removing moisture from air in a compressed air system is formed by preparing a saturated solution of lithium chloride and a polar solvent. Porous substrata are contacted with the saturated solution to wet the substrata surface. The wet substrata are heated at a sufficient temperature for a sufficient duration to drive off excess solvent from the substrate. A desiccant comprising lithium chloride impregnated substrata is produced.

According to a still further aspect of the invention, there is a method of drying compressed air in a truck brake system. A desiccant comprising a plurality of lithium chloride impregnated semi-rigid porous substrata is packed in an air passage defined by an air dryer housing. Moist air is passed through the desiccant. Water vapor is removed from the moist air, and liquefied lithium chloride is retained on the porous substrate. Low humidity air is passed through the desiccant to remove water from the liquefied lithium chloride.

According to a yet still further aspect of this invention, there is a method for dehydrating a gas. A desiccant comprising lithium chloride on rigid porous substrata is placed into a container strong enough to withstand inlet gas pressure. Saturated inlet gas flows through the desiccant and water is adsorbed by the lithium chloride. Dried gas is passed through the desiccant to remove water from and regenerate the desiccant.

A primary benefit of the present invention is the ability for the desiccant in the trailer air dryer to remove moisture from the compressed air at a high capacity.

Still another benefit resides in the oleophobic nature of the desiccant employed in the trailer braking system which results in a longer lasting desiccant over molecular sieve, zeolite based silica or alumina based substrata.

Yet another benefit of the invention is realized by the ease with which the lithium chloride impregnated substrata are made.

Still other advantages and benefits of the invention will become apparent to those skilled in the art upon a reading and understanding of the following detailed description.

DETAILED DESCRIPTION OF THE PREFERRED EMBODIMENTS

Figure 1:
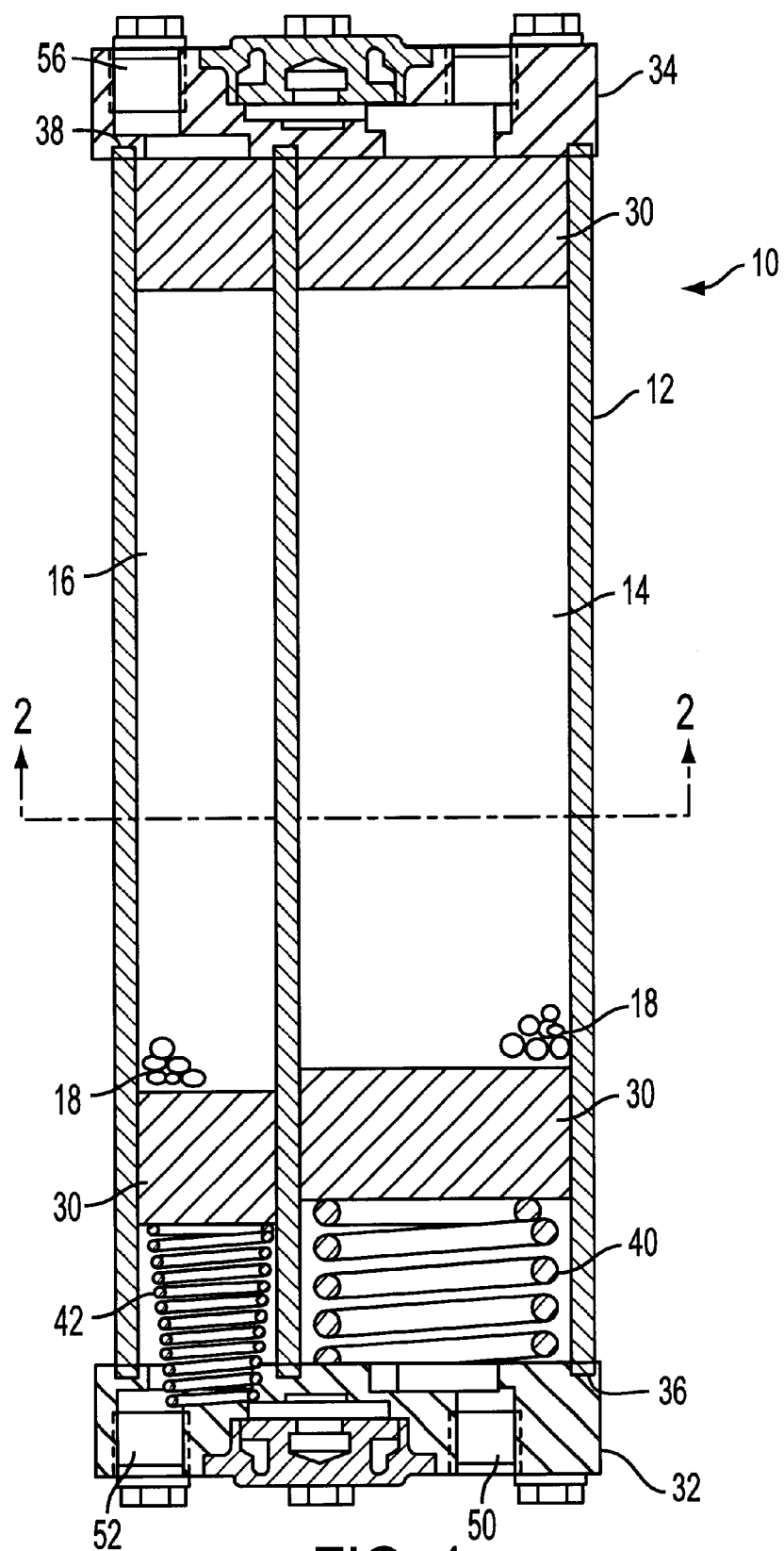
FIG. 1 is a longitudinal, cross-sectional view of a preferred form of trailer air dryer assembly.
Figure 2:
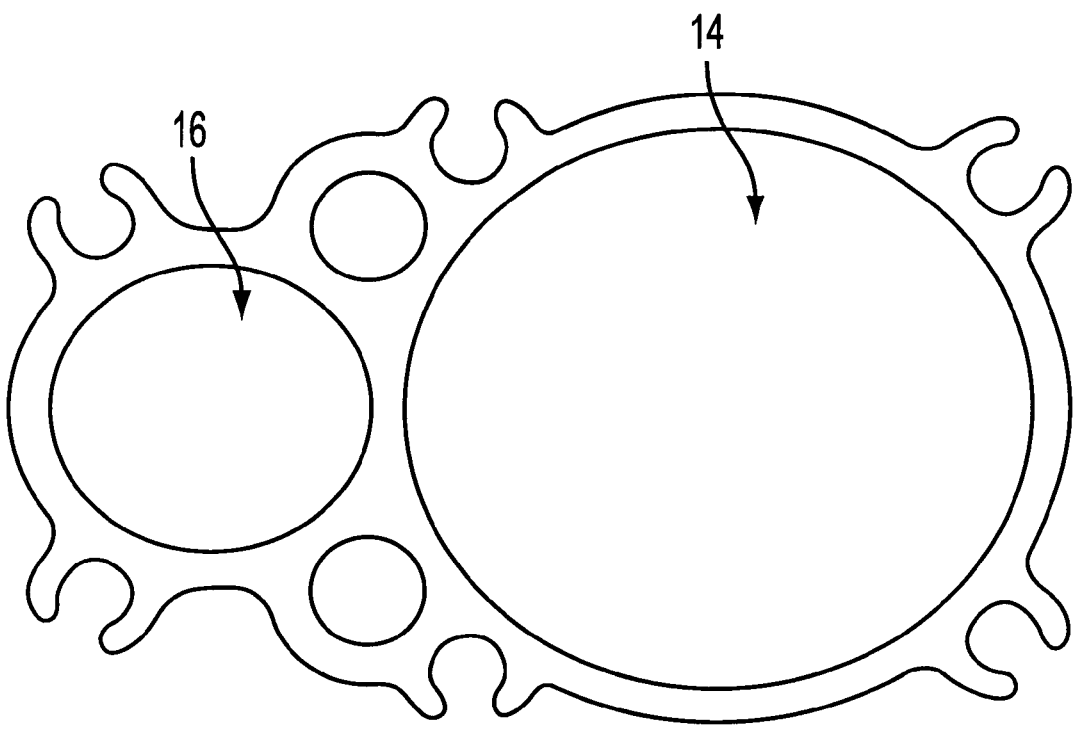
FIG. 2 is cross-sectional view taken generally along lines 2.2 of FIG. 1.

FIGS. 1 and 2 are cross-sectional views of a preferred embodiment of the trailer air dryer 10. The air dryer includes a housing 12 which is preferably an aluminum extrusion that is simple and cost effective to manufacture. Of course, alternative constructions are also contemplated without departing from the scope and intent of the present invention. The housing includes a series of generally parallel passages extending therethrough. A first passage, or supply passage 14 has the largest cross-sectional dimension of all the passages and is adapted to supply air used for trailer braking. A second, or control line, passage 16 is of slightly smaller cross-sectional dimension and is intended to carry a control signal or pneumatic pressure signal to actuate the valve in response to operator demand. The supply and control line passages each include a drying material such as a desiccant material 18 or other drying agent. The drying material fills the entire cross-section of the passage and extends for a majority of the longitudinal extent of each of the passages. The drying material is preferably contained at opposite ends by filter members 30. For example, a preferred filter member is a perforated cloth and filter media that removes particles from the air flow through the supply and control line passages. The drying materials and filter members are axially held in place in the passages by end covers 32, 34. End cover seals 36, 38 are interposed between the housing and the end covers to provide a sealed arrangement. As will be appreciated, any conventional type of seal assembly can be used.

In addition, a biasing assembly is provided to maintain the desired preload and compaction of the drying material. In the preferred arrangement, the biasing assembly is defined by a pair of springs 40, 42 received at one end of the passages 14, 16 respectively. The springs are illustrated as coil springs that engage the end cover 32 at one end and the associated filter member at the other end. The springs impose a slight compressive force or compaction on the drying material so that it operates in its intended manner.

Each end cover includes passages that communicate with the supply line and the control line (not shown), respectively. For purposes of identification, these passages are identified as 50, 52 in the supply side of the end cover and 54, 56 in the delivery side end cover. During normal operation of the trailer air dryer, air flow proceeds into the opening 50, through the filters and drying material in passage 14, and exits via the passage 54 in the second end cover. Likewise, the new pneumatic control signal is sent through opening 52, through the filter members and drying material of passage 16, and outlets through opening 56 in the second end cover.

The desiccant drying material 18 disposed in the first and second passages is comprised of a plurality of semi-rigid porous substrates impregnated with lithium chloride. A variety of materials can be used for the substrata including ceramics, plastics, pebbles, paper (e.g. honeycomb) or other porous semi-rigid materials. Preferably, the substrate is comprised of alumina. The material chosen for the substrata should be significantly strong enough to withstand vibration of trucks. It should also be able to withstand the temperature swings associated with outdoor environments. Alumina meets these qualifications. Furthermore, alumina is desirable because it adsorbs 5% to 200% of its weight in water. No specific substrata configuration is required, although a generally spherical configuration is preferred. The spherical configuration is desirable because the shape is self packing in the air dryer unit passage and can be compressed satisfactorily.

The preferred size range of the substrate spheres is such that there is not a great pressure differential across the desiccant. If the substrata are too small they will tend to flow about as the compressed air passes or flows therethrough. If they are too large the air will not be dried effectively. Hence, it has been determined that preferred size range of the spherical substrata is in the range of about $1/16"$ to $1/2"$ in diameter, preferably about $1/4" \pm 1/16"$.

The desiccant of the present invention is useful in trailer air dryers. It is also useful as an adsorbent desiccant in pressure swing dehydration systems. It functions to dehydrate compressed air or gas. The desiccant prevents freeze-ups or the accumulation of liquid water in air passageways. These events can be particularly detrimental, particularly in making brakes inoperable. The porous substrates impregnated with lithium chloride remove water vapor from compressed air. Air exiting the desiccant has a lower dew point and a relative humidity below 13%. This prevents or reduces the likelihood that water vapor will condense downstream.

In preparing the desiccant of the present invention, lithium chloride is dissolved in a polar solvent in an amount up to its saturation point. Preferably, the polar solvent is water, but other polar solvents such as low molecular weight alcohols are contemplated by this invention. The resulting liquid is applied to the substrata in a manner that distributes the lithium chloride throughout the porous substrates. For example, the saturated liquid can be sprayed onto porous substrata, or the substrata can be immersed in it. Preferably, the saturated liquid is poured over the substrata and allowed to sit until the bubbling diminishes, thus ensuring that all air is forced out. The substrata are completely wet.

The wet substrata are heated or baked at a temperature and for a duration sufficient to drive off the moisture therefrom. For example, it has been determined that the wet substrata can be heated at about 220–230 F. for about two hours to drive off any remaining water. With all the water removed, substrata impregnated with solid lithium chloride remain. These coated substrata are then stored in an airtight container until used in an air dryer system.

The substrata act as carriers for the lithium chloride desiccant. Dried lithium chloride impregnated porous substrata are packed into compressed air passageways through which moist air is passed. The lithium chloride desiccant removes moisture from the air, generally down to a safe 13% or lower level of relative humidity. The dryer removes moisture generally at high pressure, i.e., greater than about 50 psig, generally about 100–200 psig. Drier air passes out. A portion is captured or retained for regeneration of the desiccant. The remaining air is expanded to atmospheric pressure. As air flows through the desiccant, the lithium chloride begins to liquefy as water vapor is removed. Water vapor will continue to be removed as long as air or gas passing through the desiccant has a relative humidity greater than 13%. The dew point of air exiting the desiccant is reduced sufficiently so that water vapor will not condense downstream.

Moisture removal will continue until the solid lithium chloride on the porous substrata is completely diluted with removed water. The porosity of the substrata or spheres allows the lithium chloride and water to be retained on the spheres. This prevents liquefied lithium chloride from migrating downstream.

Once the lithium chloride becomes saturated, the process is reversed. Dry or low humidity air, such as the air that was captured or retained, is introduced and passed over the desiccant to regenerate or remove water from the liquefied lithium chloride. Water is evaporated from the desiccant, thus leaving the solid lithium chloride to remove moisture from the next wave of moist air.

The capacity of lithium chloride to adsorb water vapor is much greater than solid desiccants such as molecular sieve and silica gel. For example, lithium chloride offers four to six times greater adsorption capacity than the molecular sieve of the prior art. In general, molecular sieves absorb roughly 10% of their weight and silicates about 30% of their weight. Lithium chloride has 100% capacity. It is capable of doubling its weight when water is adsorbed.

The desiccant of the present invention is useful in removing moisture from gases other than air. Gas dehydration is important in improving the operation of equipment and processes where the gas is used. It is contemplated that the desiccant is useful in dehydrating gases by using the pressure swing adsorption method. Here, lithium chloride, solution or solid, is placed on substrata. The substrata are rigid, porous and preferably spherical, although other materials and configurations will serve the purpose as well. The desiccant is placed in a container that can safely handle the inlet gas pressure. Inlet saturated gas passes through the substrata at high pressures (i.e., over 50 psig) where water is removed. Dried or moisture-reduced gas re-expands through an orifice to low or atmospheric pressure and passes downstream. A small amount of the dried gas is captured and diverted. Once the desiccant becomes saturated, it is dehydrated or regenerated by flowing the dried gas through it.

The cycle can be contorted electrically, electronically, or pneumatically depending on the application. Various check valves, control valves and process valves are used to control the process. The timing depends on system sizing and other factors.

The invention has been described with reference to the preferred embodiments. Obviously, modifications and alterations will occur to others upon a reading and understanding of the detailed description. The invention is intended to include such modifications and alterations in so far as with they come within the scope of the appended claims and equivalents thereof.

We claim:

1. A method of producing dried compressed air, comprising steps of:

compressing air, said compressing step to provide compressed air that includes contaminant levels of oil therein; and passing said compressed air through a desiccant comprising a porous substrate impregnated with lithium chloride.

2. The method of producing dried compressed air of claim 1, further comprising the step of periodically passing dried air through said desiccant to regenerate the desiccant.

3. The method of producing dried compressed air of claim 1 wherein the porous substrate comprises a plurality of semi-rigid porous substrates.

4. The method of producing dried compressed air of claim 3 wherein said plurality of semi-rigid porous substrates are of a generally spherical configuration.

5. The method of producing dried compressed air of claim wherein the substrates have a diameter in a range of about $1/16"$ to about $½$.

6. The method of producing dried compressed air of claim 3 wherein said plurality of semi-rigid porous substrates are comprised of alumina.

7. The method of producing dried compressed air of claim 3 wherein the plurality of lithium chloride impregnated semi-rigid porous substrates arranged within a passage inside a housing to prevent significant relative movement between them and to enable air to flow past them.

8. The method of producing dried compressed air of claim 1 further comprising the step of delivering said dried compressed air to an air braking system.

9. The method of producing dried compressed air of claim 8 wherein said air braking system is a trailer air braking system.

10. A compressed air supply system comprising:

a source of compressed air, said compressed air including contaminant levels of oil therein; and an air dryer comprising:

(a) a housing having a passage extending therethrough for receiving air from said source and providing air to an outlet, said passage adapted for holding a drying material for removing moisture from the air; and (b) a drying material disposed in the passage, said drying material including a porous substrate impregnated with lithium chloride.

11. The compressed air supply system of claim 10 wherein the porous substrate comprises a plurality of semi-rigid porous substrates.

12. The compressed air supply system of claim 11 wherein said plurality of semi-rigid porous substrates are of a generally spherical configuration.

13. The compressed air supply system of claim 12 wherein the substrates have a diameter in a range of about $1/16"$ to about $½$.

14. The compressed air supply system of claim 11 wherein said plurality of semi-rigid porous substrates are comprised of alumina.

15. The compressed air supply system of claim 11 wherein the plurality of lithium chloride impregnated semi-rigid porous substrates arranged within the passage to prevent significant relative movement between them and to enable air to flow past them.

16. The compressed air supply system of claim 10 wherein said system is a sub-system of an air braking system.

17. The compressed air supply system of claim 16 wherein said air braking system is a trailer air braking system.

* * * * *